United States Patent
Dow et al.

(10) Patent No.: US 9,697,384 B2
(45) Date of Patent: *Jul. 4, 2017

(54) NUMERIC KEYPAD ENCRYPTION FOR AUGMENTED REALITY DEVICES

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Joseph D. Harvey, Binghamton, NY (US); Douglas E. Rohde, East Meadow, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/836,043

(22) Filed: Aug. 26, 2015

(65) Prior Publication Data
US 2016/0306958 A1    Oct. 20, 2016

Related U.S. Application Data

(63) Continuation of application No. 14/685,889, filed on Apr. 14, 2015.

(51) Int. Cl.
*G06F 11/30* (2006.01)
*G06F 21/83* (2013.01)
(Continued)

(52) U.S. Cl.
CPC .......... *G06F 21/83* (2013.01); *G06F 3/04842* (2013.01); *G06F 3/04886* (2013.01);
(Continued)

(58) Field of Classification Search
CPC ...... G06F 21/10; G06F 21/31; G06F 3/04886; H04L 63/08
(Continued)

(56) References Cited

U.S. PATENT DOCUMENTS 8,380,173 B2 * 2/2013 Zinn ............... H04W 4/12
                                                455/412.1
9,092,600 B2 * 7/2015 Scavezze ............ G06F 21/31
(Continued)

FOREIGN PATENT DOCUMENTS

CN   104463040 A  *  3/2015
EP      1347363 A1    9/2003
(Continued)

OTHER PUBLICATIONS

Andrea G. Fortey, "EyeDecrypt-Private Interactions in Plain Sight", 9th Conference on Security and Cryptography for Networks (SCN 2014).*

(Continued)

*Primary Examiner* — Samson Lemma
(74) *Attorney, Agent, or Firm* — Brian M. Restauro; Alexa L. Ashworth

(57) ABSTRACT

Embodiments of the present invention provide methods and systems for numeric keypad encryption using an augmented reality device. The method may include establishing a secure connection to an augmented reality device. A random keypad layout is generated and sent to the augmented reality device. The random keypad layout is displayed in the augmented reality view over a real-world numeric keypad.

8 Claims, 4 Drawing Sheets

(51) Int. Cl.
*G06T 19/00* (2011.01)
*G06F 3/0484* (2013.01)
*G06F 3/0488* (2013.01)
*G06F 21/36* (2013.01)
*G09G 3/20* (2006.01)
*G06T 11/60* (2006.01)

(52) U.S. Cl.
CPC .............. *G06F 21/36* (2013.01); *G06T 11/60* (2013.01); *G06T 19/006* (2013.01); *G09G 3/2092* (2013.01); *G09G 2370/16* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 9,100,493 | B1* | 8/2015 | Zhou | H04M 1/72522 |
| 2006/0103590 | A1* | 5/2006 | Divon | G02B 27/01 |
| | | | | 345/7 |
| 2011/0018903 | A1* | 1/2011 | Lapstun | G02B 26/06 |
| | | | | 345/633 |
| 2013/0124326 | A1* | 5/2013 | Huang | G06Q 30/0255 |
| | | | | 705/14.64 |
| 2013/0314303 | A1* | 11/2013 | Osterhout | G06F 3/005 |
| | | | | 345/8 |
| 2014/0035819 | A1* | 2/2014 | Griffin | G06F 3/0238 |
| | | | | 345/168 |
| 2014/0136828 | A1* | 5/2014 | Lewis | G06F 9/4445 |
| | | | | 713/2 |
| 2014/0143295 | A1* | 5/2014 | Girsch | H04L 67/141 |
| | | | | 709/202 |
| 2014/0160055 | A1* | 6/2014 | Margolis | G06F 1/163 |
| | | | | 345/174 |
| 2014/0267000 | A1* | 9/2014 | Yuen | G06K 9/00671 |
| | | | | 345/156 |
| 2016/0092877 | A1* | 3/2016 | Chew | G06Q 20/4012 |
| | | | | 705/72 |
| 2016/0162592 | A1* | 6/2016 | Li | G06F 17/30876 |
| | | | | 235/375 |
| 2016/0307001 | A1 | 10/2016 | Dow et al. | |

FOREIGN PATENT DOCUMENTS

| | | | | |
|---|---|---|---|---|
| EP | 0982676 | B1 | 10/2008 | |
| EP | 2521097 | A1 | 11/2012 | |
| WO | 2013101185 | A1 | 7/2013 | |
| WO | 2013171731 | A1 | 11/2013 | |
| WO | 2014074704 | A1 | 5/2014 | |
| WO | WO 2014074704 | A1 * | 5/2014 | G06F 9/4445 |

OTHER PUBLICATIONS

Bartlett, Graham; "Efficient Concealment of Encryption Methods"; An IP.com Prior Art Database Technical Disclosure; IP.com No. IPCOM000229310D; IP.com Electronic Publication: Jul. 19, 2013; pp. 1-12; Copyright 2013 Cisco Systems, Inc.

"Encryption on handheld device with remote server support"; An IP.com Prior Art Database Technical Disclosure; IP.com No. IPCOM000210519D; IP.com Electronic Publication: Sep. 7, 2011; pp. 1-4.

"Optimus Aux keyboard", Release date: Dec. 12, 2008; © 1995-2015 Art. Lebedev Studio; Printed Feb. 25, 2015; pp. 1-3; <http://www.artlebedev.com/everything/optimus/aux/>.

U.S. Appl. No. 14/685,889, filed Apr. 14, 2015, Entitled "Numeric Keypad Encryption for Augmented Reality Devices".

Appendix P: List of IBM Patents or Patent Applications Treated as Related, dated Aug. 26, 2015, 2 pages.

Forte, et al., "EyeDecrypt—Private Interactions in Plain Sight", Proc. 9th Conference on Security and Cryptography for Networks (SCN 2014), 19 pages.

* cited by examiner

NUMERIC KEYPAD ENCRYPTION FOR AUGMENTED REALITY DEVICES

BACKGROUND OF THE INVENTION

The present invention relates generally to the field of augmented reality, and more particularly to using an augmented reality view for securing information entered using numeric keypads.

Traditional numeric keypads such as those found on automated teller machines (ATMs) and credit card processing devices are prone to visual compromising. For example, if an attacker looks over the shoulder of an unsuspecting user or uses a camera to capture key input, then the unsuspecting user's personal information may become compromised. Personal information typically used in correlation with such traditional numeric keypads can include billing information and personal identification numbers (PINs).

Augmented reality comprises an area of known endeavor. Generally speaking, augmented reality comprises a live, direct (or indirect) view of a physical, real-world environment having contents that are augmented by computer-generated sensory input such as visually-perceivable content. In many cases the augmented reality system aligns the overlaid imagery with specific elements of the physical world. Some augmented reality approaches rely, at least in part, upon a head-mounted display. These head-mounted displays often have the form-factor of a pair of glasses. Such displays place contrived images over a portion, though typically not all of, a user's view of the world. Such head-mounted displays are typically either optical see-through mechanisms or video-based mechanisms.

Augmented reality glasses may provide an enhanced view of the real world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

SUMMARY

A method, computer program product, and computer system for keypad encryption, comprising the following steps. First, determining, by one or more computer processors, that an augmented reality device is implemented by a user. Then, establishing, by one or more computer processors, a secure connection with the augmented reality device. Then, generating, by one or more computer processors, a keypad layout. Then, sending, by one or more computer processors, the keypad layout to the augmented reality device. Then, displaying the keypad layout in an augmented reality view over a keypad. Lastly, receiving, by one or more computer processors, a user selection from the keypad layout.

DETAILED DESCRIPTION

Devices that utilize traditional numeric keypads are equipped with features in an attempt to protect personal information. For example, some machines are equipped with physical shields located around the keypad to impair the vision of an attacker. This protective feature offers a small angle of protection but makes the keypad more difficult to access. Another protective feature utilized is angle-sensitive screens. However, these screens are difficult to read even at a normal viewing angle. Furthermore, both protective features are still susceptible to recording devices and post-use analysis (i.e., dusting the keypad for fingerprints or other traces of contact). Embodiments of the present invention provide systems and methods for securely using devices having numeric keypad input interfaces, by using an augmented reality device to overlay numbers on blank keys with a random order.

Figure 1:
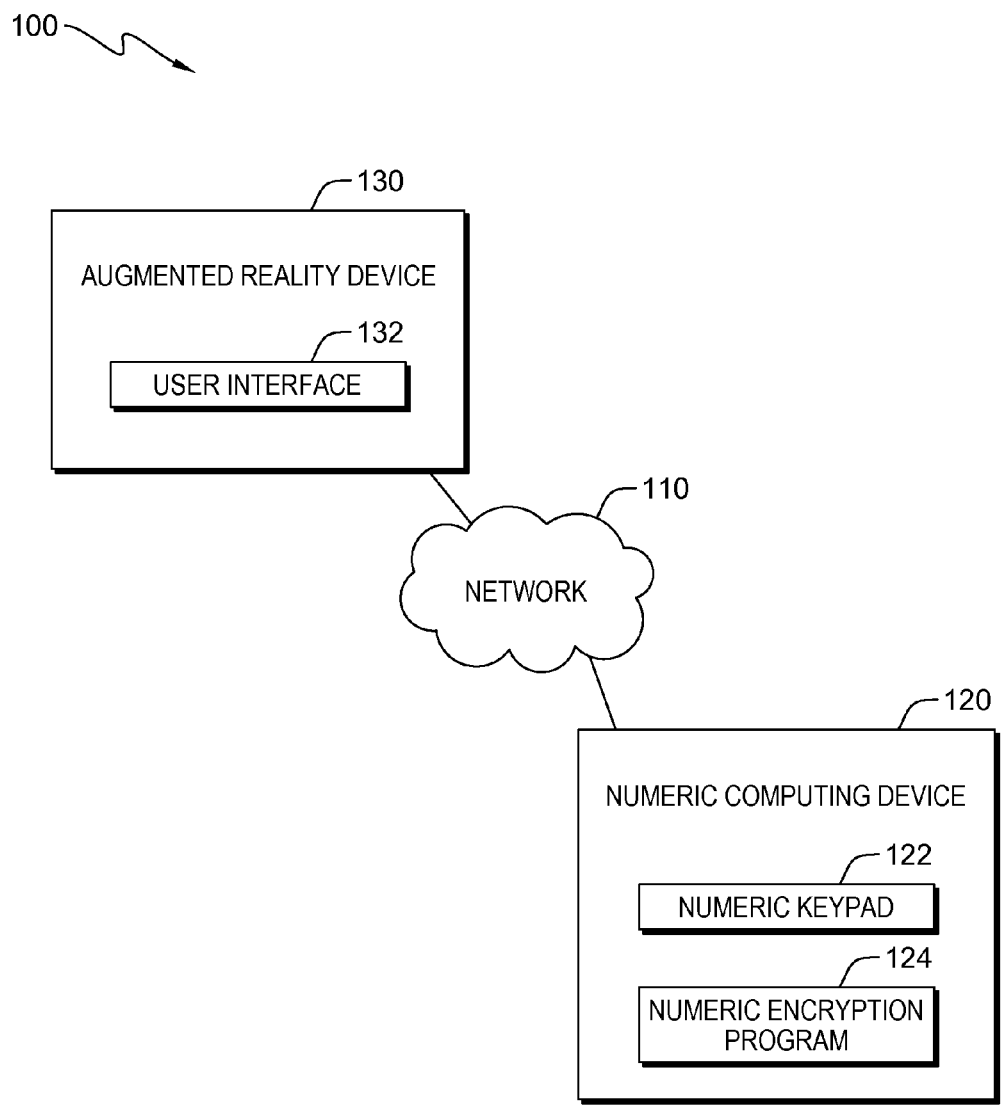
FIG. 1 is a functional block diagram illustrating an augmented reality data processing environment, in accordance with an embodiment of the present invention.

The present invention will now be described in detail with reference to the figures. FIG. 1 is a functional block diagram illustrating an augmented reality data processing environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, augmented reality data processing environment 100 includes numeric computing device 120 and augmented reality device 130, which communicate via network 110.

Numeric computing device 120 can be a desktop computer, laptop computer, specialized computer server, or any other computer system known in the art. In certain embodiments, numeric computing device 120 is representative of any electronic devices, or combination of electronic devices, capable of executing machine-readable program instructions, as described in greater detail with regard to FIG. 4.

Numeric computing device 120 comprises numeric keypad 122 and numeric encryption program 124. In the exemplary embodiment, numeric keypad 122 is an external input device used to enter personal information, for example, to provide authentication for an ATM card or a credit card. Numeric keypad 122 comprises blank, unlabeled keys. For example, on most modern ATMs and credit card processing devices, the customer is identified by inserting a plastic ATM card with a magnetic stripe or a plastic smart card with a chip that contains a unique card number and some security information such as an expiration date or card verification value code (CVVC). Authentication for the card is provided through a PIN, which is entered by the customer.

Numeric computing device 120 sends a message with the random order of keys to augmented reality device 130 via a secure short range wireless network (i.e. Bluetooth). The message is secured by using a network protocol for securing data communication, such as Transport Layer Security (TLS), and is referred to as a secure handshake hereinafter. TLS establishes a secure channel over an insecure network in a client-server architecture, connecting a TLS client application with a TLS server. The encryption used by TLS is intended to provide confidentiality and integrity of data over an unsecured network. It should be appreciated, however, that any other suitable means of securely communicating data may be used.

In the exemplary embodiment, a user looks through augmented reality device 130 at the set of blank, unlabeled keys of numeric keypad 122. Augmented reality device 130 is a wearable device, such as Google Glass™, that provides a user with an augmented reality view. It should be appreciated, however, that any other suitable means of augmenting numeric keypad 122 may be used. Generally, augmented reality is a live direct or indirect view of a physical, real-world environment whose elements are augmented (or supplemented) by computer-generated sensory input such as sound, video, graphics or GPS data. Augmented reality device 130 displays an overlay of digits (i.e., the Arabic figures of 1 through 9 and 0) on the blank, unlabeled keys of numeric keypad 122 with a random order. For example, while on traditional keypads, the digits often increase from left to right and top to bottom, the key number "1" may not be located in the upper left corner of the keypad. Similarly, key number "9" may not be located in the lower right corner of the keypad. It should be appreciated, however, that the invention is not limited to projecting digits, and other suitable means for inputting personal security information, such as symbols, letters, and words, may be used.

User interface 132 represents the interface between the user and augmented reality device 130. For example, augmented reality device 130 may be a head-up display (HUD), and user interface 132 can be either a fixed mounted or a head-mounted display. An HUD is any transparent display that presents data without requiring users to look away from their usual viewpoints. In the exemplary embodiment, user interface 132 is a head-mounted HUD that is worn by the user to overlay numbers on the blank keys of numeric keypad 122 with a random order. It should be appreciated, however, that any other suitable user interface may be used. For example, augmented reality device 130 can be directly connected to numeric computing device 120 and contain user interface 132, which is private to everyone but the user (i.e., a microscope eyepiece or mounted binoculars).

Numeric encryption program 124 can generally include any software capable of generating a random keypad layout and communicating with augmented reality device 130. Numeric encryption program 124 is a list of instructions to be used by numeric computing device 120 for the purposes of projecting a random keypad layout over numeric keypad 122 keys.

Figure 2:
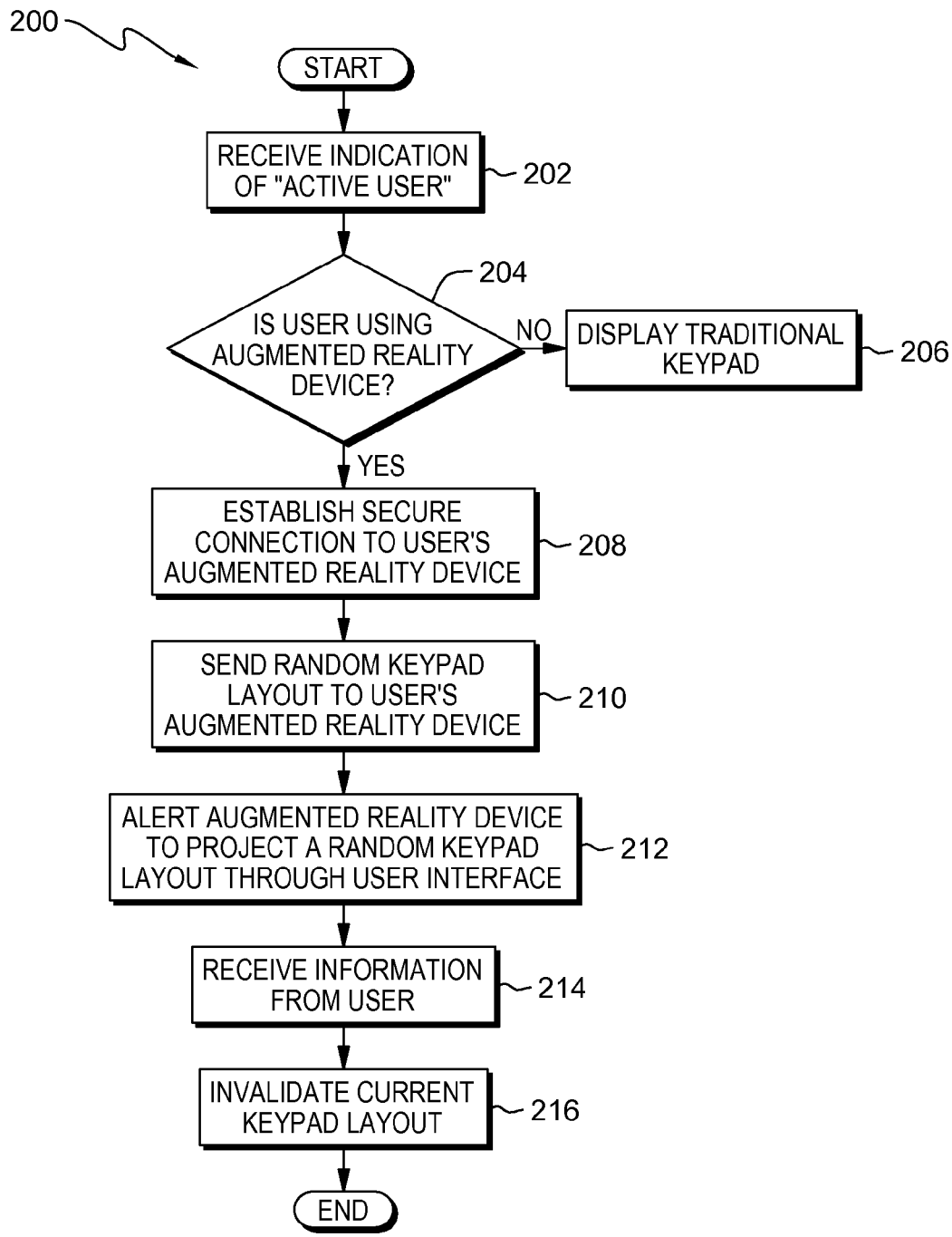
FIG. 2 is a flowchart depicting operational steps of a numeric keypad encryption system using an augmented reality device for projecting a random keypad layout, in accordance with an embodiment of the present invention.

FIG. 2 is a flowchart, generally 200, depicting operational steps of numeric encryption program 124 for projecting a random keypad layout using augmented reality device 130, in accordance with an embodiment of the present invention. In this exemplary embodiment, augmented reality device 130 projects an overlay of numbers atop the otherwise blank keys of numeric keypad 122. The ordering of the numeric layout is randomized and there is no pre-determinable order in which the numbers are presented on the blank numeric keypad 122.

In step 202, numeric encryption program 124 receives an indication that there is an active user. An active user is the user that is currently engaging numeric keypad 122. In an exemplary embodiment, the presence of an active user is detected manually. For example, numeric encryption program 124 operating on an ATM may determine the presence of an active user when the user inserts an ATM card. However, any other suitable automatic detection methods to detect the presence of the user's augmented reality device 130, such as wireless Bluetooth, may be used.

In step 204, numeric encryption program 124 determines whether the user is using augmented reality device 130. In an exemplary embodiment, numeric computing device 120 uses link management software to automatically identify that augmented reality device 130 is within a certain proximity, and to create a link to augmented reality device 130, to be able to send and receive data. For example, numeric computing device 120 and augmented reality device 130 can use Bluetooth wireless communication to detect and link to each other. In another embodiment, the user manually indicates whether augmented reality device 130 is being used (i.e., pressing a button on numeric computing device 120).

If, in step 204, numeric encryption program 124 determines that the user is not using augmented reality device 130, then in step 206 numeric computing device 120 displays numeric keys as a traditional keypad, as they appear on most standard keypads (i.e., telephone keypad), on numeric keypad 122. In an exemplary embodiment, each key is a liquid-crystal display (LCD) screen capable of dynamically displaying digits. In another embodiment, each key is a light emitting diode (LED) display. Although the use of LCD and LED screens enables randomized numbering, this technique is still susceptible to bystander view and recording devices.

If, in step 204, numeric encryption program 124 determines that the user is using augmented reality device 130, then, in step 208, numeric computing device 120 establishes a secure connection to the user's augmented reality device 130. The user's augmented reality device 130 performs a secure handshake with numeric computing device 120. As previously discussed, the connection between augmented reality device 130 and numeric computing device 120 is secured using a network protocol for securing data communication, such as TLS.

In step 210, numeric encryption program 124 sends a random keypad layout to the user's augmented reality device 130. In the exemplary embodiment, numeric computing device 120 uses an encryption technique, such as a Caesar cipher, to randomize the keypad layout. However, it should be appreciated that any other suitable encryption technique may be used. In other embodiments, numeric computing device 120 assigns Quick Response (QR) codes to numeric keypad 122 to act as anchor points for augmented reality device 130. Having definitive QR code anchor points allows augmented reality device 130 to identify the location of numeric keypad 122 keys more accurately than searching for a series of blank squares, which may be prone to more error. QR codes are a type of matrix barcode (or two-dimensional barcode) that contain information about the item to which they are attached. It should be appreciated, however, that any other suitable method of identifying the location of numeric keypad 122 keys can be used.

In step 212, numeric encryption program 124 alerts augmented reality device 130 to project the random keypad layout (sent in step 210) through user interface 132 over the blank keypad keys of numeric keypad 122. The random keypad layout is projected over the blank keys of a computing device in a random order (depicted in further detail with respect to FIGS. 3A and 3B).

In step 214, numeric encryption program 124 receives personal information from the user to authorize a transaction. In the exemplary embodiment, the user inputs information by pressing the numeric keys, as they are arranged via the random keypad layout. For example, the user will input a PIN for authorization to use an ATM. Numeric encryption program 124 receives the user's input and verifies it is correct by matching the generated overlay numbers to the user's PIN.

In step 216, numeric encryption program 124 invalidates the current random keypad layout. In the exemplary embodiment, the random keypad layout is invalidated immediately following the completion of the transaction. For example, after a user receives the requested money and a receipt from an ATM, the transaction is concluded and the current random keypad layout is invalidated. It should be appreciated that for added security, numeric computing device 120 can be designed to invalidate the current keypad layout and resend a new randomized layout for projection, at fixed intervals. For example, the current keypad layout can be set to refresh to a new random keypad layout every sixty seconds (discussed further in FIGS. 3A and 3B).

Accordingly, by performing the operational steps of FIG. 2, the random order of the keys prevents an attacker or a camera from determining the values of numeric keypad 122 keys that were pressed. There is no correlation between physical button location and numeric key value, except to the single user in immediate vicinity of the keypad, who is wearing augmented reality device 130, and who has performed a secure handshake with numeric computing device 120.

Figure 3A:
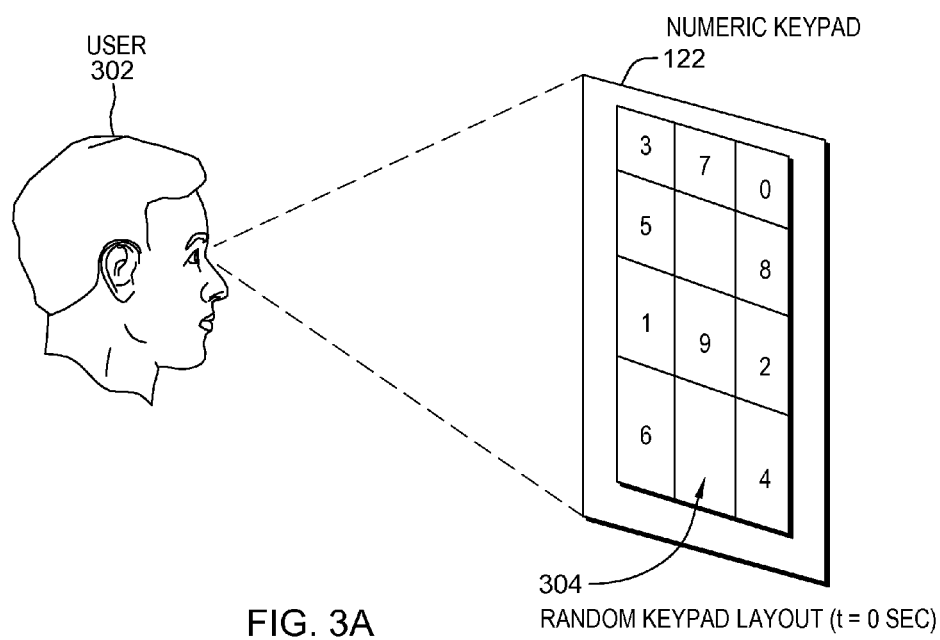
FIG. 3A is a diagram depicting a projected random keypad layout as it may appear on a numeric keypad, in accordance with an embodiment of the present invention.
Figure 3B:
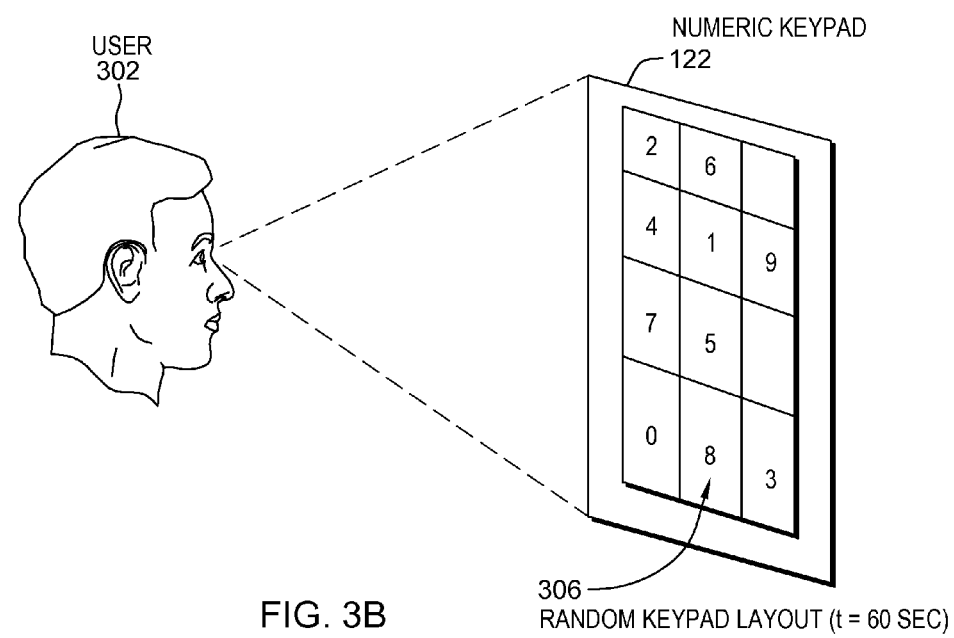
FIG. 3B is a diagram depicting a projected random keypad layout as it may appear on a numeric keypad, in accordance with an embodiment of the present invention.

FIGS. 3A and 3B show examples of projected random keypad layouts as they may appear to the user in step 212. FIG. 3A shows random keypad layout 304 initially projected over numeric keypad 122 (i.e., 0 seconds) of numeric computing device 120. User 302 is wearing augmented reality device 130, which has performed a secure handshake (step 208) with numeric computing device 120. Augmented reality device 130 projects random keypad layout 304 over numeric keypad 122. User 302 views random keypad layout 304 through user interface 132. In the example shown in FIG. 3A, random keypad layout 304 is arranged such that numeric key "3" is located in the upper left corner of numeric keypad 122, while numeric key "4" is located in the lower left corner of numeric keypad 122. The other digits of a traditional keypad are similarly displayed in a random layout over numeric keypad 122.

In FIG. 3B, as an added security measure, the initially projected random keypad layout 304 is invalidated (step 216) at a fixed interval (e.g., 60 seconds) and a new random keypad layout 306 is projected over numeric keypad 122. Augmented reality device 130 projects random keypad layout 306 over numeric keypad 122. User 302, still wearing augmented reality device 130, views random keypad layout 306 through user interface 132. In the example shown in FIG. 3B, random keypad layout 306 is arranged such that numeric key "2" is located in the upper left corner of numeric keypad 122, while numeric key "3" is located in the lower left corner of numeric keypad. The other digits of a traditional keypad are similarly displayed in a random layout over numeric keypad 122. In the exemplary embodiment, random keypad layout 306 is a different random keypad layout than random keypad layout 304 of FIG. 3A. It should be appreciated, however, that due to the random nature in which they are generated, it is possible that random keypad layout 306 is identical to random keypad 304.

Figure 4:
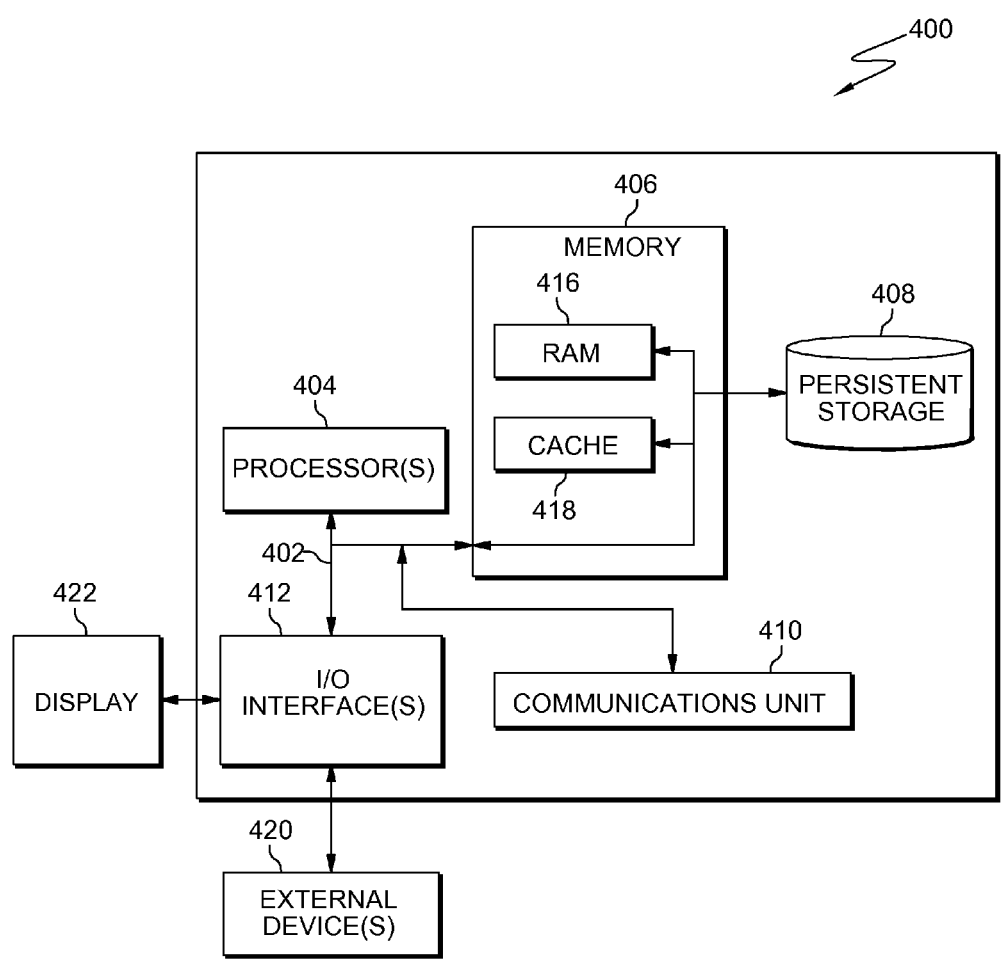
FIG. 4 is a block diagram of internal and external components of a computer system, in accordance with an embodiment of the present invention.

FIG. 4 is a block diagram of internal and external components of computing device 400, which is representative of numeric computing device 120 and augmented reality device 130 of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computer system 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for keypad encryption comprising:
   determining, by one or more computer processors, that an augmented reality device is implemented by a user;
   establishing, by one or more computer processors, a secure connection with said augmented reality device;
   generating, by one or more computer processors, a virtual keypad layout, wherein generating a virtual keypad layout comprise:
   assigning a QR code associated with keys of an external input keypad that maps anchor points for each key of the virtual keypad layout, and
   generating a randomized virtual keypad over the external input keypad, wherein the virtual keypad layout is visible only to a user associated with said augmented reality device;
   sending, by one or more computer processors, said virtual keypad layout to said augmented reality device, for displaying said virtual keypad layout over the external input keypad, wherein the external input keypad comprises keys lacking assigned values, whereby the external input keypad is obscured from viewing from persons not wearing said augmented reality device; and
   receiving, by one or more computer processors, a user selection from said virtual keypad layout.

2. The method of claim 1, wherein determining that the augmented reality device is implemented by a user comprises:
   detecting, by one or more computer processors, an identification element associated with the user; and
   linking, by one or more computer processors, said augmented reality device to a keypad device, said keypad device associated with said external input keypad and said one or more computer processors.

3. The method of claim 1, further comprising:
   responsive to determining that the augmented reality device is not implemented by said user, displaying, by one or more computer processors, a set of digits on the external input keypad.

4. The method of claim 1, wherein receiving the user selection from the virtual keypad layout comprises:
   detecting, by one or more computer processors, that said user has selected one or more keys from said virtual keypad layout; and
   matching, by one or more computer processors, the user selection with an identification from a database.

5. The method of claim 1, further comprising:
   responsive to receiving an indication that a transaction is complete, invalidating the virtual keypad layout.

6. The method of claim 1, further comprising:
   automatically invalidating, by one or more computer processors, the virtual keypad layout after a preset period of time, prior to receiving the user selection from said virtual keypad layout.

7. The method of claim 1, wherein said one or more computer processors use a secure short range wireless network to send said virtual keypad layout to said augmented reality device.

8. The method of claim 1, wherein generating a virtual keypad layout, further comprises:
   randomizing, by one or more computer processors, the virtual keypad layout, using a Caesar cipher encryption.

* * * * *